(12) United States Patent
Hornung (10) Patent No.: US 10,352,699 B2
(45) Date of Patent: Jul. 16, 2019

(54) SURVEYING DEVICE HAVING A FINE TARGETING AND TARGET TRACKING FUNCTIONALITY

(71) Applicant: LEICA GEOSYSTEMS AG, Heerbrugg (CH)

(72) Inventor: Ulrich Hornung, St. Gallen (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 253 days.

(21) Appl. No.: 15/060,370

(22) Filed: Mar. 3, 2016

(65) Prior Publication Data

US 2016/0258752 A1 Sep. 8, 2016

(30) Foreign Application Priority Data

Mar. 4, 2015 (EP) ..................................... 15157668

(51) Int. Cl.
| | |
|---|---|
| *G01C 15/00* | (2006.01) |
| *G01S 3/786* | (2006.01) |
| *G01S 17/42* | (2006.01) |
| *G01S 17/66* | (2006.01) |
| *G01S 7/486* | (2006.01) |

(52) U.S. Cl.
CPC .......... *G01C 15/002* (2013.01); *G01S 7/4868* (2013.01); *G01S 17/42* (2013.01); *G01S 17/66* (2013.01)

(58) Field of Classification Search
CPC ..... G01C 15/002; G01S 3/786; G01S 7/4868; G01S 17/42; G01S 17/66
USPC ...................................................... 250/203.2
See application file for complete search history.

(56) References Cited

U.S. PATENT DOCUMENTS

| | | | |
|---|---|---|---|
| 5,901,236 A | 5/1999 | Mizui | |
| 7,092,109 B2* | 8/2006 | Satoh | G01B 11/002 356/620 |
| 7,168,174 B2* | 1/2007 | Piekutowski | E01C 19/006 33/1 CC |
| 8,395,665 B2 | 3/2013 | Otani et al. | |
| 2008/0259312 A1* | 10/2008 | Carnegie | G01S 7/483 356/28 |

(Continued)

FOREIGN PATENT DOCUMENTS

| | | |
|---|---|---|
| CN | 101900528 A | 12/2010 |
| EP | 1 329 690 A1 | 7/2003 |

(Continued)

OTHER PUBLICATIONS

Kirschner, H. and Stempfhuber, W.: "The Kinematic Potential of Modern Tracking Total Stations—A State of the Art Report on the Leica TPS1200+." 1st International Conference on Machine Control & Guidance 2008, Jun. 2008.

(Continued)

*Primary Examiner* — Seung C Sohn
(74) *Attorney, Agent, or Firm* — Maschoff Brennan (57) ABSTRACT

Measuring device with a control and evaluation unit, a radiation source for emitting an illumination light ray and a fine targeting and target tracking functionality, a variation of the emission of the illumination light ray being effected automatically controlled by the control and evaluation unit, in the course of the fine targeting and target tracking functionality, such that a known sequence of illumination ray flashes is generated.

18 Claims, 4 Drawing Sheets

(56) References Cited

U.S. PATENT DOCUMENTS

2017/0122734 A1* 5/2017 Nordenfelt ............ G01S 17/023

FOREIGN PATENT DOCUMENTS

| EP | 1 686 350 A1 | 8/2006 |
|----|--------------|--------|
| EP | 1 876 415 A1 | 1/2008 |
| EP | 2405236 A1 | 1/2012 |
| EP | 2 620 746 A1 | 7/2013 |
| JP | H08161037 A | 6/1996 |
| JP | H1096605 A | 4/1998 |
| WO | 1997/10517 | 3/1997 |
| WO | 2011/098131 A1 | 8/2011 |

OTHER PUBLICATIONS

White Paper "Direct Aiming Station" by Topcon, 2013, retrieved from http://www.topconcare.com/files/2013/7525/6386/DS_WP_P-180-2_TE.pdf.
CN Office Action dated Feb. 28, 2018 as received in Application No. 201610123962.5.

* cited by examiner

SURVEYING DEVICE HAVING A FINE TARGETING AND TARGET TRACKING FUNCTIONALITY

FIELD OF THE INVENTION

Some embodiments of the invention relate to a surveying device having a fine targeting and target tracking functionality and to a method for such a surveying device.

BACKGROUND

Numerous surveying devices are known for surveying one or more target points. Generally known modern examples of such surveying devices are laser trackers, that is to say measuring apparatuses which are designed to continuously track a target point and to determine the position of this point in coordinates, or surveying devices specifically tailored to geodetic surveys such as tachymeters and total stations. The latter are also referred to as an electronic tachymeter or computer tachymeter and have a number of different subsystems for performing the surveying tasks in a highly automatic or automated manner. A geodetic surveying device from the prior art is described in EP 1686350, for example. In this case, the distance and direction or horizontal and vertical angle of a surveying device, the absolute position of which is known, with respect to the target point to be surveyed are recorded as spatial standard data.

In many applications, points are surveyed by placing specially configured target objects there or mounting them on a movable vehicle. These consist of, for example, a plumb rod with a retroreflector (for example a 360° prism) for defining the measurement section or the measurement point. However, surveying systems which operate without a reflector are also possible, as are described in the European patent application with the application number EP 10168771.3, for example.

The accuracies required during surveying in road or tunnel construction, for example, are in the millimeter range, even at great distances between the surveying device and the target point of more than 100 meters, with accordingly high requirements imposed on the surveying device and possibly on the retroreflective target object which is used to mark a target point to be surveyed.

In order to sight or target the target point to be surveyed, surveying devices of the generic type have a telescopic sight, for example an optical telescope, as the sighting device. The telescopic sight is generally rotatable about a vertical standing axis and about a horizontal tilting axis relative to a base of the measuring device, with the result that the telescope can be aligned with the point to be surveyed by pivoting and tilting. Modern total stations also have means for motorizing the target optics and for automatic target sighting/fine targeting and target tracking, abbreviated using ATR (Automatic Target Recognition) below. A description of such an ATR system is found, for example, in the paper by Kirschner, H. and Stempfhuber, W.: The Kinematic Potential of Modern Tracking Total Stations—A State of the Art Report on the Leica TPS1200+. 1st International Conference on Machine Control & Guidance 2008 (retrieved on Mar. 4, 2015 from www.mcg.ethz.ch/papers/Kirschner_Stempfhuber05.pdf).

The ATR systems according to the prior art have means for emitting an illumination beam and for capturing at least one part of the portion of the illumination beam reflected by a target, for example a point in the environment or a reflective prism. The illumination is usually carried out in this case by continuously emitting short illumination beam pulses or illumination beam flashes, wherein the illumination beam is, for example, a divergent laser beam and laser pulses are accordingly continuously emitted as illumination beam flashes. In this case, the reflected laser light is imaged onto an image sensor, for example a CMOS 2D chip, as a reflected spot (light spot). Depending on the deviation of the orientation of the optical targeting axis from the direction to the target object, the impingement position of the reflected radiation on the ATR sensor also deviates in this case from a central sensor area position, that is to say the light spot of the ATR illumination beam retroreflected at the prism on the ATR area sensor is not in the center of the ATR area sensor and therefore does not impinge on a desired position defined, for example using calibration, as that position which corresponds to the optical target axis. During a fine targeting function, the position of the target relative to the optical targeting axis is therefore inferred using the position of the reflected spot or the exposed pixels on the image sensor. In the case of a deviation, the fine targeting function is usually used to slightly adjust the orientation of the sighting device in a motorized manner such that the ATR measuring beam retroreflected at the prism impinges on the ATR area sensor in a highly precise manner in the center of the sensor area, that is to say the horizontal and vertical angles of the sighting device are iteratively changed and adjusted until the center of the reflected spot coincides with the desired position on the ATR area sensor. In order to ensure the functioning of the automatic fine targeting, it is necessary, before the function starts, to align the sighting device at least approximately with the target reflector in such a manner that the ATR illumination beam also impinges on the prism and, having been reflected from there, on the ATR area sensor. For this purpose, manual targeting of the target reflector on the basis of visual judgment can be carried out in advance, for example, or an automatic coarse targeting function can be carried out.

In addition to the ATR fine targeting functionality, an automatic target tracking functionality can also be provided in a similar manner and using the same ATR components, as is the case, in particular, in laser trackers, but also in modern total stations.

During target tracking, the position of the moving target is determined continuously or at very short intervals of time. The measurement/the surveying device follows the movement of the geodetic target. After ATR fine targeting has been carried out, the sighting device therefore continues to be tracked to movements of the target "live" and accordingly quickly such that the center of the ATR reflected spot still remains as accurately as possible and always at the desired position on the ATR area sensor. Reference is then often made to "locking on" to the target or to the fact that the target is "locked on".

Problems may arise in this case if the target moves so suddenly and quickly that it disappears from the field of view of the ATR detector (that is to say ATR measurement radiation reflected at the target no longer impinges on the ATR area sensor). Other causes which make it difficult or impossible to recognize the target or to fine target and track the target and restrict the maximum operational range are environmental influences. Such disruptive environmental influences are, in particular, climatic influences which influence the optical path such as rain, fog or heat shimmer. Extraneous reflections are also disruptive, that is to say, for example, light which, in addition to the measurement radiation reflected by the target, is imaged onto the image sensor. Such extraneous reflections are caused by extraneous light or beam sources such as direct solar radiation or indirect solar radiation, that is to say solar radiation reflected by road signs or glass surfaces, or headlights of construction vehicles. Disruptions are problematic, in particular during target tracking, since they often result in the locking on to the target reflection being lost, which makes it necessary to carry out time-consuming locking-on again.

In order to avoid disruptions caused by climatic influences, total stations according to the prior art provide the option of setting parameters of the ATR system or of the fine targeting and tracking function in a weather-dependent manner by means of manual configuration by the user. In this case, however, the total station is only roughly adjusted to the present climatic conditions, with the result that there is usually no optimum choice of parameters, and this is also associated with additional effort for the user.

In order to eliminate extraneous reflections and to distinguish between the reflection of the target and extraneous reflections, that is to say in order to distinguish between the reflected spot and other light spots on the sensor which stem either from external light sources or from an illumination beam component which is not reflected at a target, the prior art of automatic target recognition discloses recording two images using the image sensor with a constant alignment and position of the surveying device and the target, wherein the illumination beam is not emitted when recording one of the two images. As a result, a reflected spot can be detected only in one of the images, with the result that the reflected spot can be distinguished from noise or extraneous reflections and the target can be recognized by means of image processing with the formation of differences between the two images. However, this method is possible only for the static situation, that is to say without a relative movement of the target or extraneous reflection source with respect to the surveying device. Such a method is disclosed, for example, in the White Paper "Direct Aiming Station" by Topcon, retrieved on Mar. 4, 2015 from www.topcontotalcare.com/files/2013/7525/6386/DS_WP_P-180-2_TE.pdf.

WO 1997/10517 A1 discloses a target recognition method with modulation of the polarization of the emitted light. The disadvantage here is the additional outlay for the polarization, inter alia in the form of polarization means which additionally must be at least partially arranged on the target reflector, with the result that conventional retroreflectors cannot be used. WO 2011/098131 uses an apparatus having two differently arranged radiation sources and at least two image sensors, wherein reflections are distinguished using the signals from the image sensors during illumination with reflected light from the first radiation source and the signals during illumination with reflected light from the second radiation source. The disadvantage here again is also the additional outlay on means, this time in the form of the additional light source and image sensors. In addition, disruptive climatic influences are not dealt with in the two documents mentioned.

SUMMARY

Therefore, some embodiments of the present invention provide a surveying device having an improved automatic fine targeting and target tracking functionality.

Some embodiments of the present invention provide a surveying device having an automatic fine targeting and target tracking functionality with improved detection or consideration of extraneous reflections and/or climatic influences.

Some embodiments of the present invention provide a surveying device having an automatic fine targeting and target tracking functionality which makes it possible to set parameters of the functionality in an optimized manner with respect to the present environmental conditions.

Some embodiments provide a method for such a surveying device having a fine targeting and target tracking functionality.

The invention relates to a surveying device having a position determination functionality for determining the position of a target point with respect to an internal coordinate system. The surveying device is preferably designed as a geodetic surveying device in the form of a total station, a theodolite or a tachymeter, or as a coordinate measuring machine in the form of a laser tracker. The surveying device has a control and evaluation unit with an evaluation, data processing and control functionality, a base, and a targeting device, for example a telescopic sight or a telescope, which defines a target axis. The surveying device also has means for changing the orientation of the target axis which optionally comprise motorization means for pivoting the targeting device with respect to the base. The surveying device also has a beam source for emitting an illumination beam, in particular a laser beam, of defined intensity in the direction of the target axis, wherein the emission duration can be controlled using the control and evaluation unit in such a manner that illumination beam flashes can be continuously generated. In this case, an illumination beam flash can be understood as meaning an illumination beam of limited duration or length. In order to detect reflected illumination beams, the surveying device has a photosensitive areal sensor, in particular a CMOS 2D sensor, for detecting reflected illumination beams. The recording of images by the sensor can be controlled using the control and evaluation unit in such a manner that images capturing reflected illumination beam flashes can be continuously generated. As is known to a person skilled in the art, an "image" can be understood here as meaning the result of a time-limited capturing process in which radiation impinging on the sensor during a particular capturing period or exposure time is recorded, from which an evaluatable output signal from the sensor can be created. A ray bundle impinging on the sensor appears in the image as a light spot. A respective illumination beam flash reflected by the target point appears as a reflected spot here, in contrast to an extraneous reflection which is used to denote a light spot which is caused by extraneous radiation or by illumination radiation which is not reflected by the target point.

The surveying device also has a fine targeting and target tracking functionality. In the course of the fine targeting and target tracking functionality, a deviation between a respective current actual orientation of the target axis and a hypothetical orientation of the target axis sighting the target point is determined from the detected position of the reflected spot in the image. The target axis is oriented for fine targeting and/or tracking of the target point using the determined deviation by means of the motorization means. The target axis is therefore precisely aligned with the target point and the target axis is continuously tracked to a moving target point by means of the fine targeting and target tracking functionality. During target tracking, the position of the moving target is determined continuously or at very short intervals of time. The measurement/the surveying device follows the movement of the target.

According to the invention, the control and evaluation unit is designed in such a manner that, in the course of the fine targeting and target tracking functionality, the emission of the illumination beam is varied according to a defined algorithm under the automatic control of the control and evaluation unit. This variation is carried out in this case in such a manner that a known sequence of different illumination beam flashes is produced during continuous generation of the illumination beam flashes. In this case, the intensity and/or the emission duration of the illumination beam is/are preferably varied, with the result that the sequence has illumination beam flashes of different intensity and/or different length. Within the scope of the present invention, "known" means that information relating to the sequence of illumination beam flashes, for example the defined algorithm itself or data which are derived from the latter and make it possible to recognize the sequence, is stored, preferably in the control and evaluation unit itself. For example, this information comprises the fact that the sequence has illumination beam flashes of a first intensity and illumination beam flashes of a second intensity different from the first intensity which continuously alternate. Alternatively, the information comprises the fact that ten illumination beam flashes of the same duration are followed by two illumination beam flashes of a considerably shorter duration (or the information comprises the fact that the emission continuously varies between two intensities or ten long emissions are followed by two short emissions). The second sequence example shows similarities to symbolic coding such as Morse code, and the first sequence example resembles the continuous emission of a "simple" identification signal such as a rescue signal or the light signal from a lighthouse (in which case the times in which light is given off correspond to the illumination beam flashes of the first intensity and the times in which light is not given off correspond to the illumination beam flashes of the second intensity). Since the target point reflects the illumination beam and therefore the known sequence of illumination beam flashes, it is therefore possible to identify the target by means of the present invention in a comparatively simple manner using the illumination beam flashes reflected by the target (or the sequence of reflected illumination beam flashes reflected by the target).

In one advancement of the surveying device, the control and evaluation unit is therefore designed to identify illumination radiation reflected by the target point. In the course of the fine targeting and target tracking functionality, the identification is effected using a sequence of reflected spots corresponding to the known sequence of different illumination beam flashes, which reflected spots are continuously captured in images. In this case, for the identification, sequences of captured light spots are preferably compared with the known sequence of illumination beam flashes using defined comparison criteria stored in the control and evaluation unit. For this purpose, the comparison is carried out, for example, using detected brightnesses of the light spots. The brightness of a light spot in the image depends on the intensity of the radiation striking the sensor. More intensive illumination beam flashes (or illumination beam flashes of a longer duration) produce brighter light spots, while less intensive illumination beam flashes (or those of a shorter duration) produce darker or less bright light spots (under otherwise constant capturing conditions or image recording parameters). The sequence of illumination beam flashes which, reflected by the target point, is captured by the sensor therefore produces a sequence of light spots corresponding to the sequence of illumination beam flashes; for example, the sequence of a continuous change from intensive to non-intensive corresponds to the sequence of bright to dark. Since the sequence of illumination beam flashes is known to the control and evaluation unit, the control and evaluation unit "discerns", by comparing the two sequences, that the light spots considered are caused by an illumination beam reflected by the target point, that is to say that the light spots are reflected spots. Extraneous reflections can be recognized as such by the comparison since, for example, extraneous radiation such as sunlight or light from a headlight causes a sequence of light spots of constant brightness, or brightnesses which at least do not alternate continuously, which does not correspond to the known sequence of illumination beam flashes. The present invention therefore makes it possible to easily distinguish reflected spots and extraneous reflections or illumination radiation and extraneous radiation.

The control and evaluation unit is optionally designed for the variation in such a manner that the illumination beam flashes differ at least in such a manner that the sequence has one type of illumination beam flashes of first intensities which are within a defined standard intensity range and another type of illumination beam flashes of second intensities which are considerably below the defined standard intensity range but are preferably still considerably different from zero. In this case, "considerably below" or "considerably different" means that the second intensity is lower such that there is a sufficient ability to distinguish the illumination beam flashes and the reflected spots caused thereby, with the result that, for example, a sequence of bright to dark (or bright to less bright) can be recognized or detected with sufficient reliability. In this case, the standard intensity range is that range which would usually be selected for the intensity of the illumination beam for emission without variation during the fine targeting and target tracking functionality. In this case, all first intensities and/or all second intensities may have the same value. In this case, the emission duration is the same for all illumination beam flashes or is likewise varied depending on the type or within one type.

In a further advancement, the control and evaluation unit is designed in such a manner that the variation is dependent on a detected brightness of the reflected illumination beam. In other words, the defined algorithm is such that the brightness detected by the sensor is taken into account when varying the emission. For example, the intensity and/or the emission duration of the illumination beam is/are therefore adapted to the detected brightness. In this case, the brightness of the respective current reflected illumination beam flashes is preferably continuously detected and the emission is continuously varied dependent on the respective currently detected brightness, that is to say the emission or its variation is permanently adapted to the recorded brightness of the reflected spots. In this case, "current" does not only comprise the illumination beam flash captured last or the reflected spot in the image processed last, but may also include an illumination beam flash or a number of the illumination beam flashes recorded last. For example, the emission is optionally continuously varied dependent on the brightness in such a manner that the intensity and/or emission duration is/are adapted or optimized after each tenth, fiftieth or hundredth reflected spot or brightness detection, rather than after every individual one. Such a procedure makes it possible to save computing power with—depending on the application or required precision and/or robustness—sufficient optimization of the emission variation. In some embodiments, the photosensitive sensor is additionally designed in such a manner that recording parameters are variable and are then likewise continuously adapted dependent on the detected brightness. In terms of recording parameters, the exposure time and/or gain of the sensor, for example, is/are continuously adapted to the detected brightness, thus making it possible to optimize the signal-to-noise ratio, for example.

The emission is optionally varied on the basis of the brightness in sequences containing illumination beam flashes of a first intensity and of at least one second intensity in such a manner that the second intensities are controlled dependent on the detected brightness, and the first intensities are derived from the second intensities. That is to say, the illumination beam flashes of one type are adjusted directly dependent on the brightness, whereas the illumination beam flashes of the other type are adapted indirectly dependent on the brightness. In the present case, the first intensity therefore depends on the second intensity which is directly dependent on the brightness, the first intensity preferably being determined by multiplying the second intensity by a constant factor, wherein the factor is optionally at least 2, at least 3 or at least 5. Alternatively, both intensities, or all intensities in the case of more than two intensities, are controlled independently dependent on the detected brightness of the respective associated reflected spots, with the result that the emission for illumination beam flashes of different types can be varied differently dependent on the brightness.

In a further advancement of the surveying device, a variability of recording parameters, in particular the exposure time and/or the gain, of the photosensitive areal sensor is used, in the course of the fine targeting and target tracking functionality, to vary recording parameters, in particular the exposure time and/or gain, of the photosensitive areal sensor in addition to varying the emission of the illumination beam under the control of the accordingly designed control and evaluation unit. This is carried out, for example, in order to make the identification of illumination radiation reflected by the target point more robust. In addition, under certain circumstances, the use of illumination beam flashes of relatively low intensity outside the standard intensity range can be associated with disadvantages. In such cases, relatively poor recognizability of reflected spots resulting therefrom, for example, can be at least partially compensated for by capturing a reflected illumination beam of such a low intensity with a greater exposure time, that is to say for longer, thus achieving better detectability or data with a lower uncertainty or a better signal-to-noise ratio of the corresponding reflected spot.

The control and evaluation unit is optionally designed in such a manner that a regular sequence of a repeating pattern of illumination beam flashes is generated by means of the variation. In other words, the algorithm is such that a variation sequence is continuously repeated, thus producing a regular sequence. As a particularly simple example, the pattern is an illumination beam flash of a first intensity followed by an illumination beam flash of a second, different intensity, with the result that illumination beam flashes of two different intensities continuously alternate as a result of the pattern being repeated, in which case the emission duration likewise follows a repeating pattern of emission times of different lengths or is the same for all illumination beam flashes. The invention is nevertheless not restricted to such simple patterns or such simply uniform sequences but rather comprises more complex sequences or sequences with more variation, for example with regard to more robust distinguishability with respect to extraneous reflections.

As a further option, the control and evaluation unit is designed in such a manner that the variation is dependent on a distance to the target point. For example, the intensity or intensities of the illumination beam is/are controlled dependent on the distance, in which case the emission is preferably continuously varied dependent on the respective current distance to the target point determined using a distance measuring functionality of the surveying device, in a similar manner to the above-described dependence of the variation on the detected brightness.

The invention also relates to an alternative embodiment of a surveying device having a position determination functionality for determining the position of a target point with respect to an internal coordinate system. The surveying device is preferably designed as a geodetic surveying device in the form of a total station, a theodolite or a tachymeter, or as a coordinate measuring machine in the form of a laser tracker. The surveying device has a control and evaluation unit with an evaluation, data processing and control functionality, a base, and a targeting device, for example a telescope or a telescopic sight, which defines a target axis. The surveying device also has means for changing the orientation of the target axis which optionally comprise motorization means for pivoting the targeting device with respect to the base. The surveying device also has a beam source for emitting an illumination beam, for example a laser beam, of defined intensity in the direction of the target axis, wherein the emission duration can be controlled using the control and evaluation unit in such a manner that illumination beam flashes can be continuously generated. The surveying device also has a photosensitive areal sensor, for example a CMOS 2D sensor, with a variable exposure time and optionally a variable gain, for detecting reflected components of the illumination beam, wherein image recording by the sensor can be controlled using the control and evaluation unit in such a manner that images capturing reflected illumination beam flashes can be continuously generated, and a radiation beam impinging on the sensor appears in the image as a light spot, wherein a respective illumination beam flash reflected by the target point appears in the image as a reflected spot.

The alternative embodiment of the surveying device also has a fine targeting and target tracking functionality, wherein, in the course of the fine targeting and target tracking functionality, a deviation between a respective current actual orientation of the target axis and a hypothetical orientation of the target axis sighting the target point is determined from the detected position of the reflected spot in the image. The target axis is oriented for fine targeting and/or tracking of the target point using the determined deviation by means of the motorization means.

According to the invention, the control and evaluation unit of this alternative embodiment is designed in such a manner that, in the course of the fine targeting and target tracking functionality, a known sequence of illumination beam flashes is produced by continuously generating the illumination beam flashes, and the exposure time of the photosensitive areal sensor is varied according to a defined algorithm, matched to the emission of the illumination beam, under the automatic control of the control and evaluation unit. In this case, the variation is matched to the emission and is carried out in such a manner that a sequence of reflected spots corresponding to the known sequence of illumination beam flashes is captured during continuous generation of the illumination beam flashes. That is to say, the exposure time and the emission can be matched solely to the effect that the exposure time is sufficiently long for illumination beam flashes to be able to be captured, in particular completely.

The sequence of reflected spots is used to identify illumination radiation reflected by the target point using the detected brightnesses of the reflected spots on the basis of the variation of the exposure time. For the identification, sequences of captured light spots are preferably compared with the known sequence of illumination beam flashes with regard to detected brightnesses of the light spots using defined comparison criteria stored in the control and evaluation unit. For example, the exposure time and the emission are matched to one another in such a manner that the emission duration is always shorter than the exposure time. A variation in the exposure time then does not change the detected brightness of the reflected spots. However, the detected brightness of an extraneous reflection in the images with the longer exposure time is greater than in the images recorded with the shorter exposure time on account of the longer exposure of the sensor region capturing the extraneous radiation. Therefore, the sequence of extraneous reflections does not correspond to the sequence of illumination beam flashes, whereas the sequence of reflected spots does correspond, with the result that illumination radiation reflected by the target point can therefore be identified.

The control and evaluation unit of the alternative embodiment is optionally designed in such a manner that further recording parameters, such as the gain, of the sensor are additionally varied, and/or the exposure time and/or gain is/are continuously adapted dependent on the detected brightness of the reflected illumination beam, in a manner similar to the above-described dependence of the emission variation on the detected brightness.

In an advancement of the alternative embodiment, in addition to varying the exposure time, the emission of the illumination beam is varied. The two variations are matched to one another here in such a manner that reflected illumination radiation from illumination beam flashes of lower intensity is captured with longer exposure times than illumination beam flashes of greater intensity, in which case the exposure time is so long that the lower intensity is compensated for. The exposure time and the emission are preferably varied in a manner adapted to one another such that the detected brightness of the reflected spots in the sequence is within a standard brightness range irrespective of the intensity of the illumination beam. In other words, each image is exposed for so long that the detected brightness of the respective reflected spot is within defined limits. In this case, the limits are optionally so tight that the detected brightnesses of all reflected spots are the same. In a manner similar to the example above, illumination radiation can then be identified by virtue of the fact that the sequence of reflected spots corresponds to the variation in the emission and the variation in the exposure time, but the sequence of extraneous reflections does not; for example, such a sequence of extraneous reflections then shows brightness changes.

The surveying device of each embodiment optionally has an angle-measuring functionality for capturing the current orientation of the target axis with respect to the two axes of rotation in a highly precise manner, and a distance-measuring functionality for determining the respective current distance to the target point, that is to say the distance between the surveying device and the target, in which case both the capturing of the orientation and the determination of the distance can be carried out continuously. As a further option, the control and evaluation unit of each embodiment is designed in such a manner that the variation is carried out such that the brightness of each reflected spot from a sequence of illumination beam flashes is sufficient to precisely detect its position in the image. For example, the intensity and/or emission duration are controlled during the variation in such a manner that a minimum brightness of the reflected spots, which is sufficient to precisely detect the position of the reflected spot or its size, is achieved anyway. In a similar manner, this is alternatively or additionally carried out for the sensor-based variations.

As a further option, the control and evaluation unit of each embodiment is designed in such a manner that, in the course of the fine targeting and target tracking functionality, the reflected spots of the illumination beam flashes in the sequence are linked using a tracking algorithm, with the result that migration of the reflected spots in the images on account of a relative movement of the target point with respect to the surveying device can be tracked. In this case, migration is a different position of a reflected spot in comparison with a reflected spot from a preceding or subsequent image. Reflected spots in a plurality of images are linked, for example, using a find-best-match algorithm, thus logically concatenating the reflected spots associated with a sequence.

The present invention also relates to a method for a surveying device according to the invention. In the course of the method, by means of the fine targeting and target tracking functionality, illumination beam flashes are continuously generated by emitting the illumination beam, reflected illumination beam flashes are continuously captured in the image as a reflected spot, a deviation between a respective current actual orientation of the target axis and a hypothetical orientation of the target axis sighting the target point is determined from a detected position of the reflected spot in the image, and the target axis is oriented using the determined deviation. According to the invention, in the course of the fine targeting and target tracking functionality, the emission of the illumination beam is varied and/or the sensitivity is varied. In this case, the intensity and/or emission duration of the illumination beam and/or the exposure time and/or the gain of the photosensitive areal sensor is/are preferably varied.

As an option, the emission is varied in such a manner that the emission comprises first intensities which are within a defined standard intensity range and second intensities which are considerably below the defined standard intensity range. These are preferably sufficiently large to allow detection in this case.

Optionally, the emission is also varied dependent on a detected brightness of the reflected spots, with the result that changes in the optical path of the illumination beam which change the detected brightness are compensated for. Such changes in the optical path between the surveying device and the target point are caused, for example, by rain or boundaries between air layers of different optical density. This may result in unintentional changes in the brightness of the reflected spots over time or from a plurality of successive images determined by the control and evaluation unit, whereupon the variation is adapted, for example, by emitting a more intensive or weaker illumination beam and/or increasing or reducing the gain factor of the sensor depending thereon.

In an advancement of the method according to the invention, in the course of the fine targeting and target tracking functionality, a known sequence of illumination beam flashes is generated. Illumination radiation reflected by the target point is also identified by comparing sequences of captured light spots with this known sequence of illumination beam flashes. The comparison is preferably carried out using detected brightnesses of the light spots, for example by virtue of the sequence having light spots of different brightness in an order which corresponds to a known order of illumination beam flashes of different intensity and/or duration, and this sequence of light spots therefore being identified as coming from illumination radiation. The abovementioned continuous dependence of the emission variation on the detected brightness then provides the advantage, inter alia, that brightness-based recognition of illumination radiation reflected by the target point is more robust since unintentional brightness fluctuations which do not stem from the variation in the emission or sensor parameters and therefore make it difficult to detect the correspondence between the sequence of reflected spots and the sequence of illumination beam flashes are compensated for.

The present invention generally provides the advantage that the variation in the emission and/or recording parameters of the sensor, such as the exposure time, easily makes it possible to verify whether or not captured radiation is an illumination beam reflected by the target point. An extraneous reflection is identified as such and the situation is thereby avoided in which the target axis is incorrectly not aligned with the target point but rather with an extraneous radiation source, or incorrect locking onto an extraneous reflection is quickly detected and corrected by locking onto the reflected spot. As a result of the fact that the detection of the reflected spot is based on a known sequence of illumination beam flashes or light spots in successive images, in which case the position of the light spots can vary from image to image, the present invention is particularly advantageous for target tracking tasks or measuring tasks in dynamic environments. In this case, the variation according to the invention enables target fine targeting or target tracking without interruption since illumination beam flashes or detectable reflected spots are generated continuously. The present invention is therefore also suitable for dynamic measuring tasks, in particular for those in which the relative position of the surveying device and the target changes continuously and quickly. As a result of the present invention, fine targeting or target tracking is therefore more robust overall than in methods and devices according to the prior art, in which case the identification of the illumination radiation is simple and nevertheless reliable.

The brightness-dependent variation also provides the advantage that the variation is optimized automatically even with changing environmental conditions. For example, disruptions caused by climatic influences are compensated for according to the invention. Manual adjustments to that effect by the user, as are conventional in surveying devices according to the prior art, are therefore unnecessary. In addition, the compensation according to the invention is more accurate than only rough manual configuration.

The present invention also comprises a computer program product or computer data signal, embodied by means of an electromagnetic wave, having program code for controlling or carrying out the method according to the invention.

The surveying device according to the invention and the method according to the invention are described in more detail below using the embodiments and application procedures schematically illustrated in the drawings, in which in detail:

DETAILED DESCRIPTION

Figure 1:
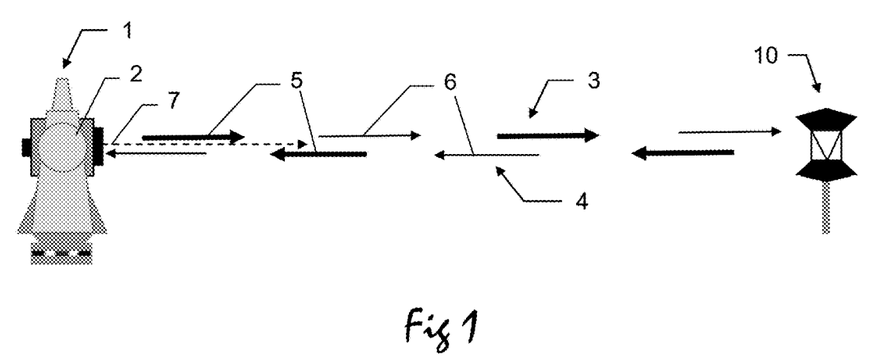
FIG. 1 schematically shows a surveying device according to the invention and a target point illuminated by the latter.

FIG. 1 shows a surveying device 1, for example in the form of an automated total station or laser tracker, having a control and evaluation unit and a targeting device 2 with a lens unit, for example a telescopic sight or a telescope, which is aligned with a target point 10 and defines an optical target axis 7. The target object 10 is in the form of a reflector, in particular in the form of a reflective prism, for example. The surveying device 1 is equipped with a beam source, for example a laser light source, for emitting an illumination beam, for example a laser beam, onto the reflector 10, from where the illumination beam is reflected back in the direction of the targeting device 2. The targeting device 2 is equipped with a spatially resolving detector such as a photosensitive area sensor, for example a CMOS 2D sensor or a camera.

The surveying device 1 has a fine targeting and target tracking functionality. In the course of this functionality, an illumination beam is emitted in this case in the direction of the optical target axis 7 of the targeting device 2, said illumination beam is retroreflected at the reflector 10 and the reflected beam is captured by the detector. Depending on the deviation of the orientation of the optical target axis 7 from the reflector, the impingement position of the reflected radiation on the detector or the spatially resolving sensor also deviates here from a central sensor area position (that is to say the reflected spot of the laser beam reflected at the reflector on the area sensor is not in the center of the latter and therefore does not impinge on a desired position which was determined, for example using calibration, as that position which corresponds to the optical target axis).

After the target object 10 has been captured by the ATR detector, the targeting device 2 is then aligned more accurately with the target object 10, in which case an iterative approximation to the ideal precise alignment is often carried out here. In addition to the targeting function, an automatic target tracking functionality will also be provided in a similar manner. After target object fine targeting has been carried out (that is to say after the targeting device 2 has been aligned with the target object 10 using a motor in such a manner that the center of the reflected spot coincides with the desired position—corresponding to the target axis 7—on the detector or area sensor), the targeting device 2 will then continue to be tracked, with continuous emission of the illumination beam and continuous capture of its reflected components by means of the sensor, to movements of the target object 10 "live" and accordingly quickly such that the center of the reflected spot still remains as accurately as possible and always at the desired position on the area sensor. Reference is then often made to the fact that the target is "locked on" (or engaged, coupled, locked to the target).

The illumination beams are emitted continuously such that individual illumination beam flashes 3, 4, for example laser pulses, are generated. That is to say, the emission is carried out in a clocked manner with a respective emission duration. As symbolized by the distance between the arrows in FIG. 1, there is a pause, which is not necessary however, between successive emissions and therefore between two successive illumination beam flashes. The illumination beam flashes 3 emitted in the direction of the target object 10 are reflected by the latter and are continuously captured by the sensor as reflected illumination beam flashes 4.

According to the invention, the control and evaluation unit is designed in such a manner that the emission of the illumination beam is varied in the course of the fine targeting and target tracking functionality. The emission duration, for example, is varied, with the result that illumination beam flashes 3, 4 of different lengths are generated, or the intensity of the illumination beam is varied, as symbolized by the arrows of different thicknesses in the example, with the result that illumination beam flashes of different intensity are generated. In the example, these are illumination beam flashes 3, 4 of a first intensity 5 and illumination beam flashes 3, 4 of a second intensity 6, which alternate continuously and regularly. A known sequence of illumination beam flashes 3, 4 is therefore generated by varying the emission, which is carried out according to a defined algorithm. This known sequence of illumination beam flashes 3, 4 is reflected by the target point 10 (with appropriate orientation of the target axis 7). The target object 10 can therefore be identified for an observer, who is aware of the sequence of emitted illumination beam flashes 3, using the reflected illumination beam flashes.

In the example, the control and evaluation unit "knows" that the sequence has alternating illumination beam flashes 3, 4 of the first intensity 5 and the second intensity 6. If the control and evaluation unit then captures light having this sequence using the photosensitive detector, the control and evaluation unit "knows" that this very light is an illumination beam reflected by the retroreflector 10. It is thus possible to distinguish between illumination radiation captured on the sensor and extraneous radiation from other radiation sources. It is therefore possible to identify the target object 10 by capturing the reflected illumination beam. In this case, with regard to the identifiability, it is not necessary for the first and second intensities 5, 6 to be known per se. The intensities 5, 6 must only be different such that the illumination beam flashes of the first intensity 5 can be distinguished from the illumination beam flashes of the second intensity 6 and a defined sequence of illumination beam flashes 3, 4 is therefore produced. Extraneous radiation which can reach the sensor in addition to the reflected illumination radiation is, for example, sunlight which strikes the sensor directly or after being reflected, for example, by a reflective object such as an automobile or another object with a shiny curved surface, or other laser beams. Such further laser beams may come, for example, from a further total station in the vicinity. The present invention therefore makes it possible to simultaneously work with a plurality of surveying devices 1 in the same measurement environment, for example even using the same retroreflector 10 for both total stations. The idea according to the invention can, of course, also be implemented with an active target object 10 which does not reflect illumination radiation but rather itself transmits a defined sequence of illumination beam flashes in the direction of the observer, for example the total station or the laser tracker, wherein the sequence is known to the observer by virtue of the fact that the information relating to the sequence is stored in advance with the observer or is transmitted to the observer on a separate transmission channel, for example by radio.

Figure 2:
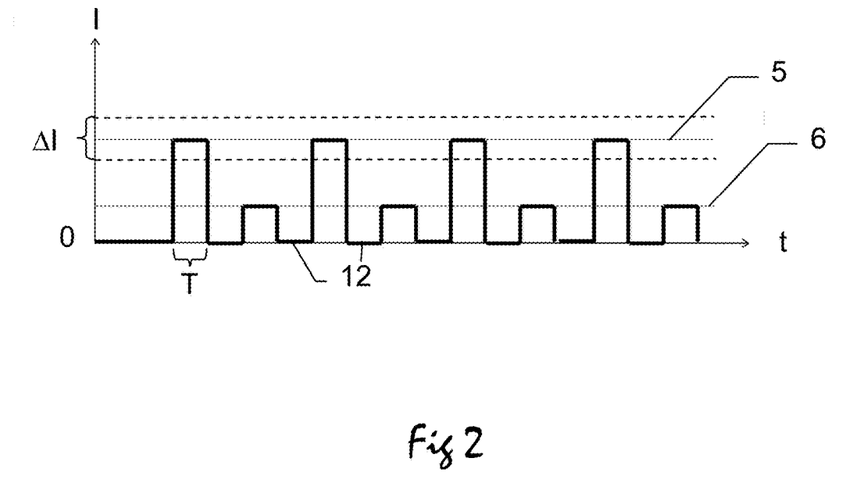
FIG. 2 shows an example of the temporal profile of the intensity of the illumination beam.

FIG. 2 schematically shows the temporal profile of the intensity of the illumination beam from the geodetic surveying device from FIG. 1. An illumination beam of the first intensity 5 and an illumination beam of the second intensity 6 are each emitted alternately during the emission duration T, interrupted by periods 12 without emission, thus producing the known sequence of illumination beam flashes. The first intensity 5 or the energy level of the beam source is typically at least initially set to or around the maximum effective power which is permissible with respect to protection provisions. In the example, the known sequence is uniform and has a continuously repeating pattern of illumination beam flashes which consists of precisely one illumination beam flash of the first intensity 5 and precisely one illumination beam flash of the second intensity 6 with the same emission duration T for both illumination beam flashes. In addition to this very simple example, many further alternatives are conceivable, for example a uniform sequence with a repeating pattern containing more than two intensities, in which case illumination beam flashes of a first type, the intensities of which are within a standard intensity range $\Delta I$ around the first intensity 5, and illumination beam flashes of another type with intensities which are considerably below the standard intensity range $\Delta I$, for example with the second intensity 6 or in a range around the latter, are generated, for example. Additionally or alternatively, the sequence has illumination beam flashes of different emission durations or a pattern with a number of illumination beam flashes of the first intensity 5 regularly "interrupted" by an illumination beam flash of the second intensity 6, or the variation is pseudo-random, with the result that a pseudo-random sequence of illumination beam flashes of different intensity and/or duration is generated. It is only decisive for the invention that the variation is carried out according to a defined algorithm, with the result that the sequence is known.

Figure 3A:
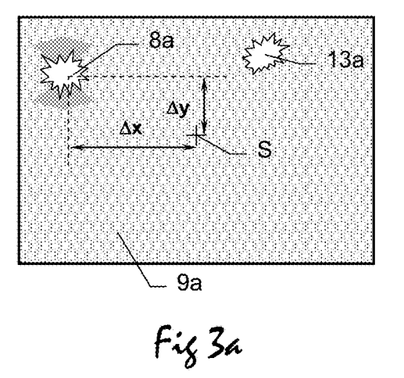
FIGS. 3a-d show examples of sequences of reflected spots and extraneous reflections.

FIG. 3a shows an ATR image 9a recorded using the ATR detector. In this case, a captured beam appears in the image as a light spot or a group of exposed pixels beside one another, wherein the sensor is designed in such a manner that the brightness of the light spot can be detected or determined. The brightness is in turn dependent on the intensity of the captured beam, the gain of the sensor and the time during which the corresponding pixels are illuminated. In this case, a reflected spot 8a is understood as meaning a light spot which is generated by reflected illumination radiation. Such a reflected spot 8a with a defined, detected brightness is schematically illustrated in the image 9a. The reflected spot 8a has an offset $\Delta x$ and $\Delta y$ from the desired position S, that is to say the position of the reflected spot 8a in the image 9a deviates from the ideal position which corresponds to an orientation of the target axis which sights the target point. The image 9a also captures a further light beam, for example a sunbeam or the beam from a headlight, as a light spot 13a, referred to as an extraneous reflection 13a below.

According to the determined deviation $\Delta x$ and $\Delta y$ of the position of the reflected spot 8a from the desired position S, correction angles for the orientation of the targeting device are determined and corresponding corrections are carried out using controlled servomotors until the reflected spot 8a and the desired position S match one another, that is to say the horizontal and vertical angles of the sighting or targeting device are changed and adapted until the center of the reflected spot 8a coincides with the desired position S on the area sensor. This is carried out continuously for target tracking, for which purpose illumination beam flashes are continuously emitted and images 9a are continuously recorded. In this case, image recording, and related to this the exposure duration of the sensor, and the emission of the illumination beam are preferably matched to one another such that one illumination beam flash is captured for each image 9a and each reflected spot 8a is therefore produced by one illumination beam flash.

Figure 3B:
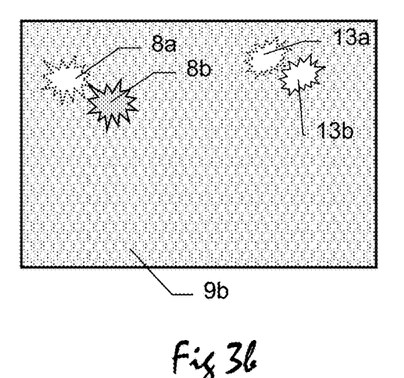

FIG. 3b shows a second image 9b which is recorded after the image 9a from FIG. 3a with the same exposure duration and gain. A second reflected spot 8b produced by a second illumination beam flash appears in the image 9b. On account of a changed orientation of the target axis or targeting device in the course of the fine targeting and target tracking functionality and/or on account of a movement of the target object, the position of the second reflected spot 8b is different from the position of the previous, first reflected spot 8a which is captured in the image 9a and is indicated using dotted lines in the image 9b for simpler position comparison. For the same reason, the position of the second extraneous reflection 13b deviates from that of the previous, first extraneous reflection 13a from image 9a. The respective light spots 8a, 8b and 13a, 13b are linked using tracking methods known from the prior art, for example with the aid of a find-best-match algorithm, in order to be able to observe the behavior, specifically the profile of the brightness, of the respective associated light spots over time despite their "migration" from image 9a to image 9b.

The sequence of illumination beam flashes on which the reflected spots 8a and 8b are based is generated according to the form illustrated in FIG. 1 and FIG. 2, that is to say the first reflected spot 8a is produced by an illumination beam flash of the first intensity, and the second reflected spot 8b is produced by an illumination beam flash of the second intensity. On account of the constant image recording parameters and the same emission duration or duration of the illumination beam flashes, the brightness of the first reflected spot 8a is therefore greater than that of the second reflected spot 8b, indicated by their different grayscale values in FIGS. 3a and 3b. In contrast, the detected brightness of the extraneous reflections 13a and 13b caused by the radiation of constant intensity is constant.

Figure 3C:
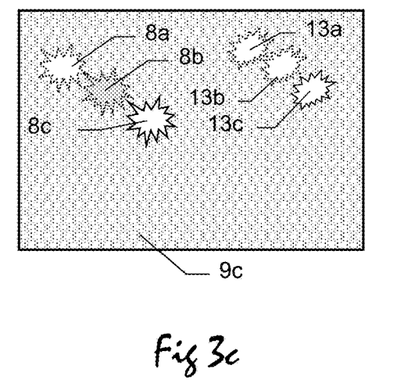
Figure 3D:
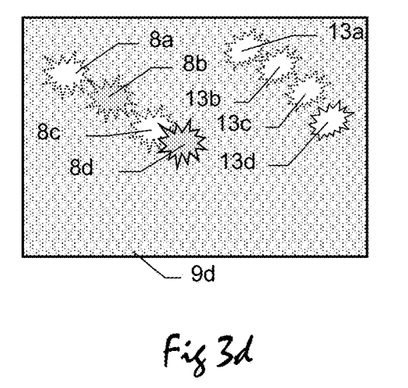

FIGS. 3c and 3d accordingly show further images 9c and 9d which are recorded in succession and have third and fourth reflected spots 8c and 8d and third and fourth extraneous reflections 13c and 13d. For easier comparison, the previous light spots are each indicated using dotted lines. On account of the continued variation in the emission of the illumination beam, the third reflected spot 8c, produced by an illumination beam flash of first intensity, has the same brightness as the first reflected spot 8a and the fourth reflected spot 8d, produced by an illumination beam flash of second intensity, has the same brightness as the second reflected spot 8b. In contrast, the brightnesses of the extraneous reflections 13a-13d are still show no difference with light radiation intensity assumed to be constant.

Therefore, two sequences of light spots, that of the light spots (reflected spots) 8a-8d and that of the light spots (extraneous reflections) 13a-13d, are produced from the images 9a-9d. The sequence of reflected spots 8a-8d with its brightness change corresponds in this case to the known sequence of illumination beam flashes, but the sequence of extraneous reflections 13a-13d of constant brightness does not correspond. As a result, the respective sequence can be used to distinguish which light spots 8a-8d and 13a-13d are produced by illumination radiation, that is to say are reflected spots 8a-8d, and which stem from extraneous radiation, that is to say are extraneous reflections 13a-13d. Illumination radiation can therefore be distinguished from extraneous radiation or, in other words, illumination radiation reflected by the target object can be identified.

For the sake of simplicity, the present example shows a very simple sequence of reflected spots 8a-8d and assumes constant intensity of the extraneous radiation. Identifiability is nevertheless ensured even when the intensity of the extraneous radiation is also not constant over time, that is to say the brightness of the extraneous reflections 13a-13d also differs, since even then the sequence of these light spots does not correspond to the known sequence of illumination beam flashes. In order to exclude any random correspondence of emission changes in an extraneous radiation source to the sequence of illumination beam flashes, a complicated sequence of illumination beam flashes can be used as the sequence selected in the example.

In this case, the second intensity of the illumination beam is selected to be lower than the first intensity such that, on the one hand, the brightnesses of the reflected spots 8a, 8c, on the one hand, and those of the reflected spots 8b, 8d, on the other hand, differ sufficiently and, on the other hand, is selected to be sufficiently large that each reflected spot 8a-8d, including the relatively weak reflected spots 8b, 8d, can be detected, with the result that a position in the respective image 9a-9d can be assigned to each reflected spot 8a-8d. This provides both the ability to detect the correspondence between reflected spots and illumination beam flashes and interruption-free determination of the deviation and therefore target point tracking.

Depending on the measurement conditions, the weaker reflected spots, that is to say the reflected spots 8b, 8d for example, may be disadvantageous with regard to fine targeting or target tracking on account of their relatively low brightness. One option for avoiding such disadvantages despite varying the emission of the illumination beam, for example according to FIG. 2, is described below using FIG. 4.

Figures 4A, 4B:
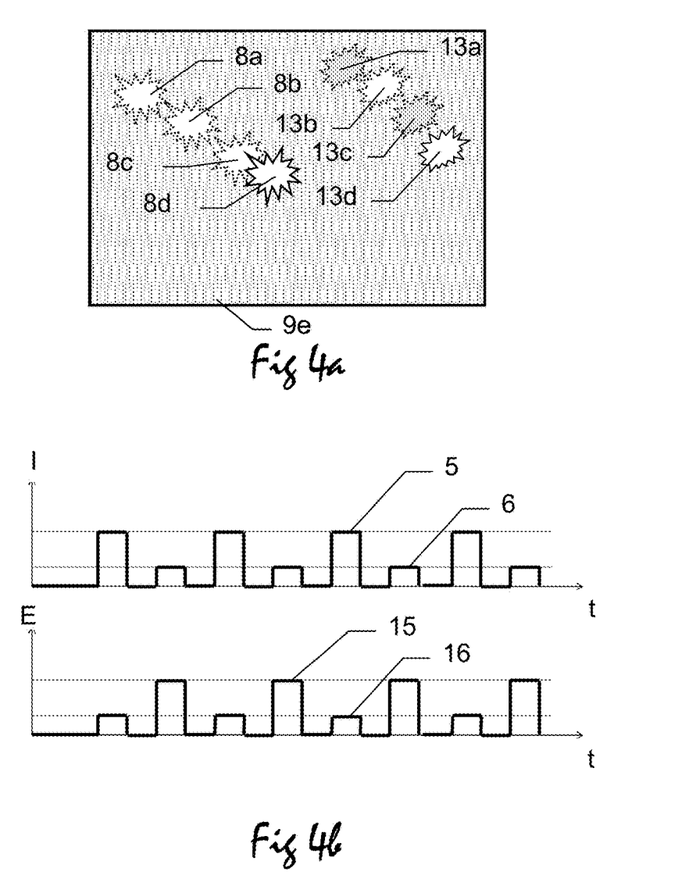
FIGS. 4a-c show an example of a brightness-dependent variation.

In a manner similar to FIG. 3d, FIG. 4a shows a fourth image from a number of images which are recorded in succession and have a reflected spot 8d and an extraneous reflection 13d. The previous three reflected spots 8a-8c and extraneous reflections 13a-13c from the previous three images are again indicated using dotted lines for comparison purposes. In contrast to the example according to FIGS. 3a-3d, the reflected spots 8a-8d this time show a constant brightness, whereas the brightness of the extraneous reflections 13a-13d fluctuates. This is achieved by the control and evaluation unit varying the exposure time of the photosensitive sensor in the surveying device using a defined algorithm in such a manner that the variation in the emission, that is to say the intensity for example, is compensated for.

FIG. 4b schematically illustrates this. The top of the figure shows the temporal intensity profile of the illumination beam flashes in a manner similar to FIG. 2, and the bottom illustrates the temporal profile of the exposure time E which is in sync with the first-mentioned temporal profile. The exposure time E of the sensor for capturing the illumination beam flashes of the first, greater intensity 5 from FIG. 2 is shorter than that for capturing illumination beam flashes of the second, lower intensity 6. In other words, the exposure time E is continuously changed between a first, relatively large value 15, which is used to capture the less intensive illumination beam flashes, and a second, relatively small value 16, which is used to capture the more intensive illumination beam flashes. The variation in the exposure time E is therefore matched to the emission of the illumination beam or the sequence of illumination beam flashes.

In a manner different from FIG. 4a, FIG. 4c again illustrates the result of these matched variations. The temporal profile of the detected brightness B of the reflected spots 8 can be seen at the top of FIG. 4c, and the temporal profile of the detected brightness of the extraneous reflections 13, each in sync with one another and with the time axes from FIG. 4b, can be seen at the bottom. On account of the variation in the exposure time, the latter is extended for the illumination beam flashes of the intensity 6 in such a manner that the detected brightness B of the corresponding reflected spots (8b, 8d from FIG. 4a) is exactly the same as the detected brightness B of the reflected spots of the stronger illumination beam flashes (8a, 8c in FIG. 4a). This produces a sequence of reflected spots 8 of constant brightness.

In contrast, the brightness of the extraneous reflections 13 accordingly changes—assuming constantly intensive extraneous radiation—from image to image and over the course of time t: the extraneous reflections 13 with the longer exposure times (15 in FIG. 4b) appear bright (correspond to the extraneous reflections 13b, 13d from FIG. 4a), but those extraneous reflections 13 which are captured with the relatively short exposure time (16 in FIG. 4b) have a low brightness (corresponding to the extraneous reflections 13a, 13c from FIG. 4a). The brightness of the sequences of light spots 13 therefore differs from that of the sequence of light spots 8, thus making it possible to identify the reflected illumination radiation by means of the present invention.

As an alternative or in addition to adapting the exposure time E, the gain of the area sensor is varied, thus likewise making it possible to adjust the detected brightness of the reflected spots 8, 8a-8d in a manner similar to the procedure described above. As an alternative solution, this is carried out, for example, when the duration of the individual illumination beam flashes (period T in FIG. 2) is not greater than the exposure time E, as is an implicit prerequisite above.

Figure 4C:
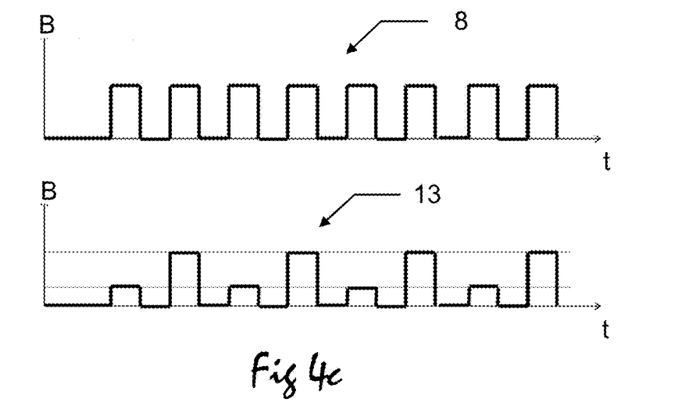

If the exposure time E is set in such a manner that each illumination beam flash is completely captured in each of these capturing windows, the illumination beam can also be identified when only the exposure time E of the sensor is varied without varying the emission of the beam. In this alternative embodiment, purely identical illumination beam flashes are therefore generated and are captured with different exposure times E, in which case the emission and the exposure time E are matched to one another to the effect that each exposure time E is sufficiently long to completely detect each illumination beam flash reflected by the target point. The exposure time E is varied, for example, by alternately using a first exposure time and a second exposure time, the second exposure time being longer than, for example twice as long as, the first exposure time. Since the emission does not vary, reflected spots 8a-8d and 8 of constant brightness B are produced irrespective of the exposure time E, as illustrated in FIGS. 4a and 4c. However, the brightness B of the extraneous reflections 13a-13d and 13 varies again for the same reasons as those mentioned above (assuming extraneous irradiation during the entire exposure time, for example as a result of sunlight or light from headlights) since a longer exposure time E is associated with greater brightness B for the extraneous beam. The brightness sequence of the extraneous reflections 13a-13d and 13 which is illustrated in FIG. 4 is therefore produced again, for example. In this alternative, reflected spots 8, 8a-8d are therefore identified by virtue of the fact that they have a constant brightness B.

If signal noise is taken into account, the illumination beam can also be identified using the signal-to-noise ratio, for example. With an illumination beam of constant intensity, this ratio for the reflected spots 8, 8a-8d is dependent on the exposure time E since the noise component increases with the exposure time E, but is not dependent on the exposure time for the extraneous reflections 13, 13a-13d since, in these reflections, the signal component also increases in addition to the noise component, as described, with the result that the signal-to-noise ratio remains constant or at least its change differs from that of the sequence of reflected spots.

Figure 5:
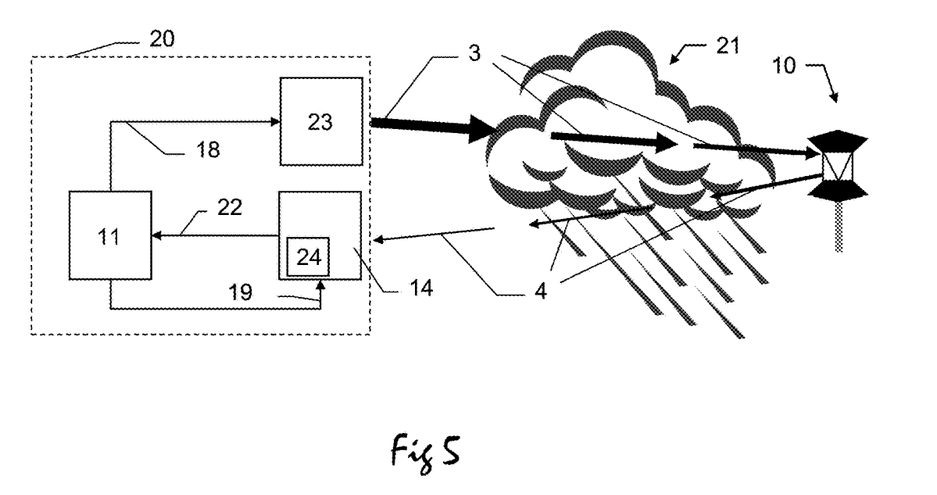
FIG. 5 shows an example of a control loop for optimizing the variation.

In one advancement described using FIG. 5, the detected brightness of reflected spots is used to optimize the variation in the emission of the illumination beam. FIG. 5 shows a section 20 of the surveying device with the beam source 23, for example a laser diode, and the photosensitive areal sensor 14, for example a CMOS 2D sensor, with means 24 for detecting the brightness of the light spots produced by captured radiation, in which case recording parameters, such as the exposure time and gain of the sensor, can be controlled. The laser 23 emits the illumination beam in the form of illumination beam flashes 3. These are captured by the sensor 14 as illumination beam flashes 4 retroreflected by the target 10. Disruptive environmental influences, for example climatic influences symbolized by the rain cloud 21, in this case change the optical path of the illumination beam and result, for example, in the attenuation of the illumination beam flashes, symbolized by the decreasing thickness of the arrows 3, 4. The brightness detection means 24 record the brightness of the respective reflected spot of the reflected illumination beam flashes 4 and transmit said data (arrow 22) to the control and evaluation unit 11.

The control and evaluation unit 11 evaluates the brightness data, for example by comparing the detected brightness with a desired brightness. If the control and evaluation unit 11 determines a deviation from the desired value, that is to say the currently captured brightness undershoots or exceeds an optimal or desired brightness, the control and evaluation unit 11 readjusts the emission of the illumination beam and/or the image recording by the sensor 14 (arrows 18 and 19). That is to say the emission and/or the image recording is/are continuously varied dependent on the currently detected brightness. If the recorded brightness undershoots the desired value, the power of the laser 23, for example, is increased, with the result that the intensity of all illumination beam flashes is increased, and/or the exposure time of the sensor 14 is increased, with the result that the pixels are illuminated for longer. As a result of this control loop, parameters of the ATR system, such as illumination beam intensity or duration, exposure time or sensitivity of the sensor, are therefore automatically adapted to the respective present environmental conditions, with the result that disruptions caused by rain or fog, for example, are compensated for automatically and/or the situation is avoided in which the photosensitive sensor is set to be too sensitive since, as a result of an unnecessarily large gain for example, more extraneous reflections are captured which would otherwise be suppressed from the outset as too faint.

As described, the control loop controls, for example, the intensity of the illumination beam. In this case only the intensity of one type of illumination beam flashes is preferably controlled directly dependent on the brightness. For example, the second intensity (cf. FIG. 2) is adapted to the detected brightness. In this case, this continuous optimization of the second intensity is carried out, in particular, with the aim of being sufficiently able to detect all reflected spots at any time despite disruptive environmental influences. In other words, the control means that the brightness of the reflected spots does not undershoot (or else exceed) a minimum value and a deviation of the brightness from a desired value is "immediately" and automatically counteracted. The first, greater intensity is then derived from the second intensity, for example by means of multiplication by a factor which is fixedly set to 2, 3 or 5, for example, with the result that the second intensity is twice, three times or five times as great as the first intensity, in which case a maximum value can be optionally stipulated for the first intensity, for example for safety reasons or owing to the limited maximum power of the beam source. This simple dependence of the first intensity on the second intensity easily achieves a sufficiently great difference between the intensities and therefore the brightness of the reflected spots even during continuous optimization of the illumination beam intensity. Alternatively, the first (and possibly further) intensity is not continuously controlled indirectly but rather likewise directly dependent on the detected brightness of the associated reflected spots.

Alternatively or additionally, the emission and/or the parameters of the area sensor is/are also varied in a similar manner dependent on the distance to the target point. This distance has an effect on the brightness or detectability of the reflected spots, with the result that disadvantageous effects caused by changes in the distance between the surveying device and the target point can be compensated for by continuously adapting the variation. Constant brightness levels even when the distance changes can thus be achieved by means of a distance-dependent variation of the illumination beam intensity, for example. A purely distance-dependent variation is useful, for example, when favorable environmental conditions, free of disruptive influences such as snowfall or severe solar radiation, are present.

What is claimed is:

1. A surveying device comprising:
   a control and evaluation unit with an evaluation, data processing and control functionality;
   a base;
   a targeting device which defines a target axis,
   motorization means for changing the orientation of the target axis;
   a beam source for emitting an illumination beam of defined intensity in the direction of the target axis, wherein the emission duration of the illumination beam can be controlled using the control and evaluation unit in order to emit illumination beam flashes which can be continuously generated;
   a photosensitive area sensor having a plurality of pixels for detecting reflected illumination beams, wherein
      image recording by the sensor can be controlled using the control and evaluation unit in such a manner that images capturing reflected illumination beam flashes can be continuously generated, and
      a radiation beam impinging on the sensor appears in the image as a light spot, wherein a respective illumination beam flash reflected by the target point appears in the image as a reflected spot; and
   a fine targeting and target tracking functionality, wherein, in the course of the fine targeting and target tracking functionality, a deviation between a respective current actual orientation of the target axis and a hypothetical orientation of the target axis sighting the target point is determined from the detected position of the reflected spot in the image, and the target axis is oriented for fine targeting and/or tracking of the target point using the determined deviation by means of the motorization means, such that the target axis is precisely oriented in the direction of the target point and/or the target axis is continuously tracking the moving target point,
   wherein the control and evaluation unit is designed in such a manner that, in the course of the fine targeting and target tracking functionality, the emission of the illumination beam is varied according to a defined algorithm whereby the variation is automatically controlled by the control and evaluation unit, with the result that a known sequence of different illumination beam flashes is produced during continuous generation of the illumination beam flashes, and
   wherein the control and evaluation unit identifies illumination radiation reflected by the target point in the course of the fine targeting and target tracking functionality using a sequence of reflected spots corresponding to the known sequence of different illumination beam flashes, which reflected spots are continuously captured in a plurality of successive images.

2. The surveying device according to claim 1, wherein:
   wherein, for the identification, sequences of captured light spots and/or reflected spots are compared with the known sequence of illumination beam flashes using defined comparison criteria stored in the control and evaluation unit, wherein the comparison is effected with respect to detected brightnesses of the light spots and/or reflected spots.

3. The surveying device according to claim 1, wherein:
   the control and evaluation unit is designed for generating an intensity variation in such a manner that the illumination beam flashes differ at least in such a manner that the sequence has one type of illumination beam flashes of first intensities which are within a defined standard intensity range and another type of illumination beam flashes of second intensities which are considerably below the defined standard intensity range in such a way that thereby caused reflected spots are distinguishable from each other upon detection.

4. The surveying device according to claim 1, wherein:
   the control and evaluation unit is designed in such a manner that a variation of the emission of the illumination beam is dependent on a detected brightness of the reflected illumination beam, wherein
   the brightness of the respective current reflected illumination beam flashes is continuously detected and the emission is continuously varied on the basis of the respective currently detected brightness, and/or
   recording parameters such as the exposure time and/or gain of the sensor with regard to an optimum signal-to-noise ratio, are continuously adapted on the basis of the detected brightness.

5. The surveying device according to claim 4, wherein:
   second intensities are controlled dependent on the detected brightness, and
   first intensities are derived from the second intensities, by multiplication by a constant factor.

6. The surveying device according to claim 5, wherein the factor is, at least 2.

7. The surveying device according to claim 5, wherein the factor is at least 3.

8. The surveying device according to claim 5, wherein the factor is at least 5.

9. The surveying device according to claim 1, wherein:
   recording parameters including the exposure time and/or gain of the photosensitive area sensor are variable and the control and evaluation unit is designed in such a manner that, in the course of the fine targeting and target tracking functionality, the exposure time and/or gain, of the photosensitive areal sensor are varied in addition to varying the emission of the illumination beam.

10. The surveying device according to claim 1, wherein:
the control and evaluation unit is designed in such a manner that a uniform sequence of a repeating pattern of illumination beam flashes is generated by means of a variation of the emission of the illumination beam, wherein
illumination beam flashes of two different intensities continuously alternate, and/or
the emission duration of all illumination beam flashes is the same,
and/or the control and evaluation unit is designed in such a manner that the variation is dependent on a distance to the target point, wherein the emission is continuously varied dependent on a respective current distance to the target point determined using a distance measuring functionality of the surveying device.

11. A surveying device comprising:
a control and evaluation unit with an evaluation, data processing and control functionality;
a base;
a targeting device, which defines a target axis;
motorization means for changing the orientation of the target axis;
a beam source for emitting an illumination beam of defined intensity in the direction of the target axis, wherein the emission duration can be controlled using the control and evaluation unit in such a manner that illumination beam flashes can be continuously generated;
a photosensitive area sensor having a plurality of pixels with a variable exposure time and a variable gain, for detecting reflected components of the illumination beam, wherein
image recording by the sensor can be controlled using the control and evaluation unit in such a manner that images capturing reflected illumination beam flashes can be continuously generated, and
a radiation beam impinging on the sensor appears in the image as a light spot, wherein a respective illumination beam flash reflected by the target point appears in the image as a reflected spot;
a fine targeting and target tracking functionality, wherein, in the course of the fine targeting and target tracking functionality, a deviation between a respective current actual orientation of the target axis and a hypothetical orientation of the target axis sighting the target point is determined from the detected position of the reflected spot in the image, and the target axis is oriented for fine targeting and/or tracking of the target point using the determined deviation by means of the motorization means, such that the target axis is precisely oriented in the direction of the target point and/or the target axis is continuously tracking the moving target point, wherein:
the control and evaluation unit is designed in such a manner that, in the course of the fine targeting and target tracking functionality,
a known sequence of illumination beam flashes is produced by continuously generating the illumination beam flashes, and
the exposure time of the photosensitive area sensor is varied according to a defined algorithm, matched to the emission of the illumination beam, under the automatic control of the control and evaluation unit,
with the result that a sequence of reflected spots corresponding to the known sequence of illumination beam flashes is captured in a plurality of successive images during continuous generation of the illumination beam flashes, which sequence of reflected spots is used to identify illumination radiation reflected by the target point using detected brightnesses of the reflected spots on the basis of the variation of the exposure time,
wherein for the identification, sequences of captured light spots and/or reflected spots are compared with the known sequence of illumination beam flashes with regard to detected brightnesses of the light spots and/or reflected spots using defined comparison criteria stored in the control and evaluation unit, and/or
wherein recording parameters of the sensor are additionally varied, and/or the exposure time and/or gain is/are continuously adapted dependent on the detected brightness of the reflected illumination beam.

12. The surveying device according to claim 11, wherein:
the control and evaluation unit is designed in such a manner that, in addition to a first variation of the exposure time, a second variation of the emission of the illumination beam is effected, wherein the first and second variations are matched to one another in such a manner that reflected illumination radiation from illumination beam flashes of lower intensity is captured with longer exposure times such that the lower intensity is compensated for, such that the detected brightness of the reflected spots in the sequence is within a standard brightness range irrespective of the intensity of the illumination beam, wherein the detected brightnesses of all reflected spots are the same.

13. The surveying device according to claim 11, wherein:
the control and evaluation unit is designed in such a manner that a variation of the emission of the illumination beam is effected such that the brightness of each reflected spot from a sequence of illumination beam flashes is sufficient to precisely detect its position in the image,
and/or the surveying device has
an angle-measuring functionality for capturing the current orientation of the target axis with respect to the two axes of rotation in a highly precise manner, and
a distance-measuring functionality for determining the respective current distance to the target point.

14. The surveying device according to claim 11, wherein:
the control and evaluation unit is designed in such a manner that, during the fine targeting and target tracking functionality, the reflected spots of the illumination beam flashes in the sequence are linked using a tracking algorithm with the result that migration of the reflected spots in the images on account of a relative movement of the target point with respect to the surveying device can be tracked.

15. A method comprising:
generating illumination beam flashes by emitting an illumination beam;
continuously capturing reflected illumination beam flashes in a plurality of successive images as reflected spots;
determining a deviation between a respective current actual orientation of the target axis and a hypothetical orientation of the target axis sighting the target point from a detected position of a reflected spot in at least one of the images;
orienting the target axis using the determined deviation, varying an intensity and/or emission duration of the illumination beam, and/or varying an exposure time and/or gain of a photosensitive area sensor.

16. The method according to claim 15, wherein:

the emission is varied:

dependent on a detected brightness of the reflected spots, with the result that obstructions to the illumination beam which change the detected brightness are compensated for, and/or in such a manner that the emission comprises first intensities which are within a defined standard intensity range and second intensities which are considerably below the defined standard intensity range in such a way that thereby caused reflected spots are distinguishable from each other upon detection.

17. The method according to claim 15, wherein:

in the course of the fine targeting and target tracking functionality, a known sequence of illumination beam flashes is generated, with the result that illumination radiation reflected by the target point is identified by comparing sequences of captured light spots and/or reflected spots with the known sequence of illumination beam flashes, wherein the comparison is effected using detected brightnesses of the light spots and/or reflected spots.

18. A non-transitory computer program product which is stored on a machine-readable carrier or computer data signal embodied by means of an electromagnetic wave, having program code which is suitable for carrying out the method according to claim 15.

* * * * *